Apr. 10, 1923.

G. M. BOGIE ET AL 1,451,007

HORSESHOE

Filed Mar. 10, 1921

Inventors
George M. Bogie
Arthur Smithson
By A. M. Carlsen
Attorney

Patented Apr. 10, 1923.

1,451,007

UNITED STATES PATENT OFFICE.

GEORGE M. BOGIE AND ARTHUR SMITHSON, OF GLENWOOD, MINNESOTA.

HORSESHOE.

Application filed March 10, 1921. Serial No. 451,273.

*To all whom it may concern:*

Be it known that we, GEORGE M. BOGIE and ARTHUR SMITHSON, citizens of the United States, residing at Glenwood, in the county of Pope and State of Minnesota, have invented a new and useful Horseshoe, of which the following is a specification.

Our invention relates to nailless horseshoes, and the main object is to provide a horseshoe of said class which is of simple construction and not injurious to horse hoofs while it may be easily and quickly attached or detached.

In the accompanying drawing,—

Figure 1:
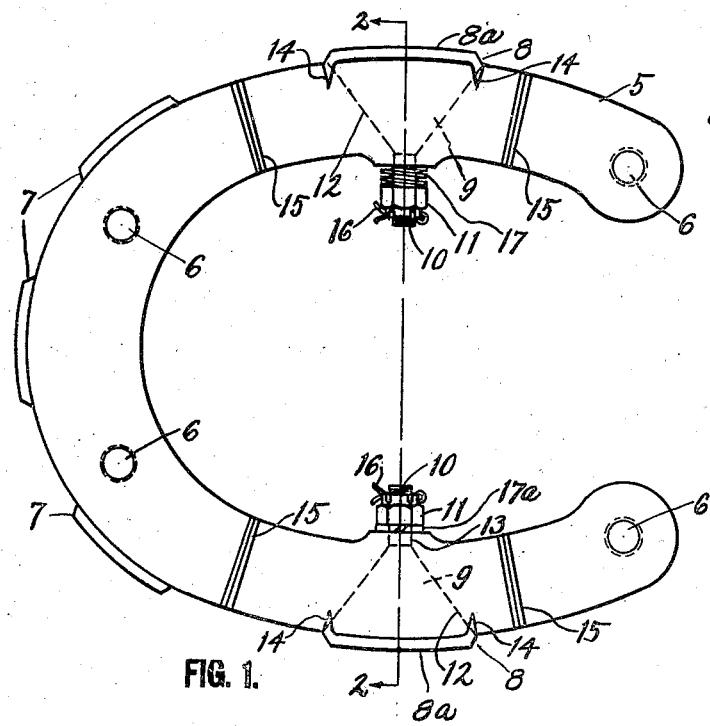
Figure 1 is a top view of a horseshoe embodying our improvements.

Referring to the drawing by reference numerals, the horseshoe proper, 5, is of approximately the usual form and may be provided with screw-calks 6 or welded calks (not shown).

Figure 2:
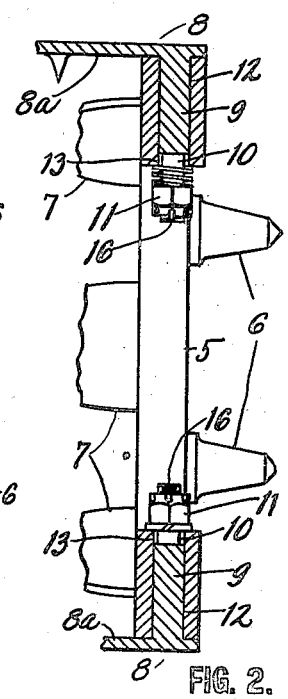
Fig. 2 is a section on line 2—2 in Fig. 1.
Figure 3:
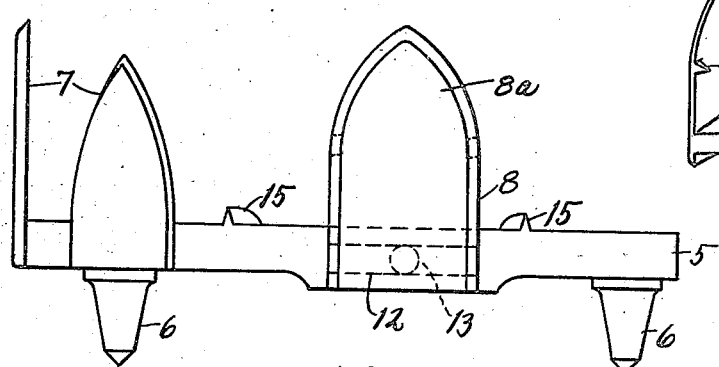
Fig. 3 is a side elevation of Fig. 1.
Figure 4:
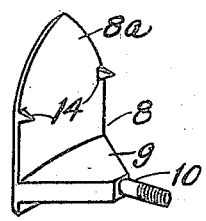
Fig. 4 is a perspective view, on a slightly reduced scale, of one of the detachable fingers.

7 are clasping fingers integral with the shoe and projecting vertically from the outer edges thereof. 8 are two detachable fingers oppositely arranged at the widest part of the shoe. As best shown in Figs. 2 and 4, each of these detachable fingers 8 is L-shaped, the vertical portion 8$^a$ serving same purpose as fingers 7, the horizontal portion 9 being an almost triangular plate tapering inward to a rounded end portion or round shank 10 which is threaded for a nut 11. The taper portion 9 fits into a corresponding slot 12 which is widened toward the outer edge of the horseshoe and the threaded end projects through a hole 13. 14 are inwardly projecting prongs on the vertical plate or flat finger 8$^a$ for engaging the sides of the hoof.

15 are a series of radially arranged knife-edge ribs on the top surface of the horseshoe, which are used as auxiliary means to hold the shoe firmly in place on the hoof.

In applying the shoe, the front fingers 7 rest against that portion of the hook and the shoe proper is hammered against the bottom of the hook, the knife-ribs 15 thereby being forced into the hoof. The width of the shoe should be a little less than the width of the hoof so that when the side fingers 8 are inserted and the prongs 14 lightly driven into the side of the hoof said fingers can be further tightened by turning the nuts 11, which nuts are provided with notches arranged to be engaged by cotter-pins 16 in the shanks 10. To prevent excessive pressure on the hook we provide a yielding element between the nut 11 and the inside of the shoe, such as a coil spring 17 or a spring washer 17$^a$.

In the application of the improved shoe it is obvious that the nuts 11 enable the shoe to be applied to hooks of different sizes, and that while the fingers 7 may be bent into contact with the hoof there is no need of clenching them with an injurious pressure against the hoof, as the fingers 8$^a$ with the prongs 14 will always hold the shoe firmly, and if they ever become slack by wear they can be tightened by turning the nuts 11.

What we claim is:

1. A nailless horseshoe comprising an integral rigid body piece with horizontally directed apertures, one in each side, slidable members one in each aperture and having each at the inner end a threaded nut and the outer end provided with an upwardly directed flat finger adapted to engage the hoof, said apertures being wider in horizontal direction than in vertical direction toward the outer edge of the shoe and the slidable part of each member placed therein being broadened so as to be strong near the finger, but reduced in width toward the threaded portion.

2. The structure specified in claim 1, and resilient means between the shoe and said nuts.

3. The structure specified in claim 2, and means to prevent escape of the nut and to hold the nut in the desired turned position.

In testimony whereof we affix our signatures.

GEORGE M. BOGIE.
ARTHUR SMITHSON.